United States Patent
Noh et al.

(10) Patent No.: US 10,410,436 B2
(45) Date of Patent: Sep. 10, 2019

(54) METHOD AND APPARATUS FOR VERIFYING VEHICLE IN INTER-VEHICULAR COMMUNICATION ENVIRONMENT

(71) Applicants: Hyundai Motor Company, Seoul (KR); Kia Motors Corporation, Seoul (KR); Korea University Research and Business Foundation, Seoul (KR)

(72) Inventors: Dong Gyu Noh, Gyeonggi-do (KR); Su Lyun Sung, Seoul (KR); Dae Sung Hwang, Gyeonggi-do (KR); Jong Rok Park, Seoul (KR); Hahk Rel Noh, Gyeonggi-do (KR); Cho Rong Ryu, Incheon (KR); Tae Jun Lee, Gyeonggi-do (KR); Hyo Gon Kim, Seoul (KR); Yong Tae Park, Gyeonggi-do (KR); In Seon An, Seoul (KR); Tae Ho Kim, Gyeonggi-do (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/829,650

(22) Filed: Dec. 1, 2017

(65) Prior Publication Data
US 2019/0096144 A1    Mar. 28, 2019

(30) Foreign Application Priority Data
Sep. 22, 2017    (KR) .................... 10-2017-0122721

(51) Int. Cl.
*G07C 5/00*    (2006.01)
*G08G 1/017*    (2006.01)
(Continued)

(52) U.S. Cl.
CPC ............ *G07C 5/008* (2013.01); *G08G 1/017* (2013.01); *G08G 1/09675* (2013.01);
(Continued)

(58) Field of Classification Search
CPC ........ G07C 5/008; G08G 1/017; G08G 1/161; H04W 12/10; H04W 4/80; H04W 4/008
See application file for complete search history.

(56) References Cited

U.S. PATENT DOCUMENTS

| | | | |
|---|---|---|---|
| 7,787,606 | B2 | 8/2010 | Lee |
| 9,577,997 | B2 | 2/2017 | Mabuchi |

(Continued)

FOREIGN PATENT DOCUMENTS

| | | | |
|---|---|---|---|
| JP | 5958535 B2 | 8/2016 | |
| KR | 10-0651841 B1 | 11/2006 | |

(Continued)

*Primary Examiner* — Thomas D Alunkal
(74) *Attorney, Agent, or Firm* — Mintz Levin Cohn Ferris Glovsky and Popeo, P.C.; Peter F. Corless (57) ABSTRACT

An apparatus for verifying a vehicle in an inter-vehicular communication environment includes: a communication unit configured to receive a basic safety message and a verification message from a remote vehicle that is allowed to engage in inter-vehicular communication; and a controller configured to determine that the remote vehicle is reliable when the communication unit receives the verification message from the remote vehicle at least a predefined number of times over a predefined period of time, and to generate permission to utilize the basic safety message received from the remote vehicle when the controller determines that the remote vehicle is reliable.

18 Claims, 6 Drawing Sheets

(51) Int. Cl.
  *H04W 12/00* (2009.01)
  *H04W 12/10* (2009.01)
  *G08G 1/0967* (2006.01)
  *G08G 1/16* (2006.01)
  *H04W 4/80* (2018.01)

(52) U.S. Cl.
  CPC ....... *G08G 1/096791* (2013.01); *G08G 1/161* (2013.01); *H04W 12/10* (2013.01); *H04W 4/80* (2018.02)

(56) References Cited

U.S. PATENT DOCUMENTS

| | | | |
|---|---|---|---|
| 10,109,193 B2 * | 10/2018 | Song | G08G 1/096791 |
| 2007/0019235 A1 | 1/2007 | Lee | |
| 2007/0096885 A1 * | 5/2007 | Cheng | B60W 40/04 340/435 |
| 2007/0222555 A1 * | 9/2007 | Tengler | H04L 9/3263 340/5.6 |
| 2009/0271112 A1 * | 10/2009 | Basnayake | G01S 5/0072 701/469 |
| 2010/0201543 A1 * | 8/2010 | Shorey | G08G 1/161 340/902 |
| 2011/0044172 A1 * | 2/2011 | Yim | H04L 47/14 370/236 |
| 2011/0083011 A1 * | 4/2011 | DiCrescenzo | H04L 9/006 713/158 |
| 2011/0238987 A1 * | 9/2011 | Kherani | H04L 1/0041 713/168 |
| 2011/0261890 A1 * | 10/2011 | Nagura | H04L 9/3247 375/259 |
| 2013/0165146 A1 | 6/2013 | Stahlins et al. | |
| 2015/0095997 A1 | 4/2015 | Mabuchi | |
| 2016/0107661 A1 * | 4/2016 | Cooper | B61L 15/0027 246/167 R |
| 2016/0119151 A1 * | 4/2016 | Park | H04L 9/006 713/158 |
| 2018/0088887 A1 * | 3/2018 | LeBlanc | B60R 11/0235 |
| 2018/0286229 A1 * | 10/2018 | Szuprycinski | H04W 4/44 |

FOREIGN PATENT DOCUMENTS

| | | |
|---|---|---|
| KR | 10-2013-0041214 A | 4/2013 |
| KR | 10-2014-0084591 A | 7/2014 |
| KR | 10-1584001 B1 | 1/2016 |

* cited by examiner

METHOD AND APPARATUS FOR VERIFYING VEHICLE IN INTER-VEHICULAR COMMUNICATION ENVIRONMENT

CROSS-REFERENCE TO RELATED APPLICATION

This application claims the benefit of priority to Korean Patent Application No. 10-2017-0122721, filed on Sep. 22, 2017 in the Korean Intellectual Property Office, the disclosure of which is incorporated herein in its entirety by reference.

TECHNICAL FIELD

The present disclosure relates to a method and an apparatus for verifying a vehicle in an inter-vehicular communication environment, and more particularly, to a technology of determining trustability of a remote vehicle by using a verification message based on short-range wireless communication in an inter-vehicular communication environment.

BACKGROUND

V2X (Vehicle to Everything) communication includes V2V (Vehicle to Vehicle) wireless communication, V2I (Vehicle to Infrastructure) wireless communication, IVN (In-Vehicle Networking), and V2P (Vehicle to Pedestrian) communication. IEEE 1609.2 is one of the V2X wireless communication standards which defines a security framework. The security framework of IEEE 1609.2 defines a process of verifying a transmitter (in a vehicle) using symmetric keys and asymmetric keys and by verifying the integrity of a message transmitting process.

Verification in IEEE 1609.2 is a process of giving a qualification for participation in inter-vehicular communication and determining of the trustability of a message containing vehicle information that is transmitted from a vehicle qualified for participation in inter-vehicular communication is not be handled. Accordingly, it is impossible to determine whether a message transmitted by a vehicle that passed the verification process defined in IEEE 1609.2 is trustable when the vehicle is allowed to participate in inter-vehicular communication.

In other words, the vehicle verifying technology in traditional inter-vehicular communication environment simply allows for or forbids inter-vehicular communication, and cannot determine whether vehicle information transmitted by a vehicle, to which inter-vehicular communication is allowed, is trustable.

SUMMARY

The present disclosure is conceived to solve the above-described problems of the related art. The present disclosure provides a method and an apparatus for verifying a vehicle in an inter-vehicular communication environment, in which it may be determined whether information transmitted by a remote vehicle, to which inter-vehicular communication is allowed, is trustable, by verifying the remote vehicle using a verification message based on short-range wireless communication.

The objects of the present disclosure are not limited to the above-mentioned ones, and the other unmentioned objects and advantages of the present disclosure will be understood by the following description, and will be understood clearly by the embodiments of the present disclosure. Further, it is noted that the objects and advantages of the present disclosure will be implemented through the means described in the claims and a combination thereof.

In accordance with embodiments of the present disclosure, an apparatus for verifying a vehicle in an inter-vehicular communication environment includes: a communication unit configured to receive a basic safety message and a verification message from a remote vehicle that is allowed to engage in inter-vehicular communication; and a controller configured to determine that the remote vehicle is reliable when the communication unit receives the verification message from the remote vehicle at least a predefined number of times over a predefined period of time, and to generate permission to utilize the basic safety message received from the remote vehicle when the controller determines that the remote vehicle is reliable.

The verification message received from the remote vehicle may include a certificate digest of the remote vehicle, a unique number of the remote vehicle, and a unique number reception list of the remote vehicle.

The controller may be further configured to generate a second verification message including a unique number reception list of a host vehicle, a certificate digest of the host vehicle, and a unique number of the host vehicle, and to control the communication unit to transmit the generated second verification message to the remote vehicle.

The controller may be further configured to determine whether the remote vehicle is reliable based on a number of times a verification message including the unique number of the host vehicle is received from the remote vehicle.

The controller may be further configured to generate a trust point based on the number of times the verification message including the unique number of the host vehicle is received from the remote vehicle, and to determine that the remote vehicle is reliable when the calculated trust point exceeds a threshold point.

The controller may be further configured to match the certificate digest of the remote vehicle, the unique number of the remote vehicle, and the trust point of the remote vehicle, and to record a result of the matching in the unique number reception list of the second verification message.

The controller may be further configured to subtract a predefined point from the calculated trust point per one second.

The communication unit may include a first communication module configured to receive the basic safety message from the remote vehicle, and to transmit a second basic safety message to the remote vehicle; and a second communication module configured to receive the verification message from the remote vehicle, and to transmit a second verification message to the remote vehicle.

The second communication module may be further configured to transmit the second verification message based on short-range wireless communication.

A transmission distance of the second verification message may be shorter than the transmission distance of the second basic safety message, and a transmission period of the second verification message may be longer than a transmission period of the second basic safety message.

Furthermore, in accordance with embodiments of the present disclosure, a method for verifying a vehicle in an inter-vehicular communication environment includes: receiving, by a communication unit, a basic safety message and a verification message from a remote vehicle that is allowed to engage in inter-vehicular communication; determining, by a controller, that the remote vehicle is reliable when the communication unit receives the verification message from the remote vehicle at least a predefined number of times over a predefined period of time; and generating, by the controller, permission to utilize the basic safety message received from the remote vehicle.

The verification message received from the remote vehicle may include a certificate digest of the remote vehicle, a unique number of the remote vehicle, and a unique number reception list of the remote vehicle.

The determining may include generating, by the controller, a second verification message including a unique number reception list of a host vehicle, a certificate digest of the host vehicle, and a unique number of the host vehicle; and controlling, by the controller, the communication unit to transmit the generated second verification message to the remote vehicle.

Further, the determining may include determining, by the controller, whether the remote vehicle is reliable based on a number of times a verification message including the unique number of the host vehicle is received from the remote vehicle.

Then, the determining may include generating, by the controller, a trust point based on the number of times the verification message including the unique number of the host vehicle is received from the remote vehicle; and determining, by the controller, that the remote vehicle is reliable when the calculated trust point exceeds a threshold point.

The determining may include matching, by the controller, the certificate digest of the remote vehicle, the unique number of the remote vehicle, and the trust point of the remote vehicle; and recording, by the controller, a result of the matching in the unique number reception list of the second verification message.

The determining may further include subtracting, by the controller, a predefined point from the calculated trust point per one second.

The method may further include: receiving, by a first communication module of the communication unit, the basic safety message from the remote vehicle; transmitting, by the first communication module, a second basic safety message to the remote vehicle; receiving, by a second communication module of the communication unit, the verification message from the remote vehicle; and transmitting, by the second communication module, a second verification message to the remote vehicle.

The second verification message may be transmitted based on short-range wireless communication.

Further, a transmission distance of the second verification message may be shorter than the transmission distance of the second basic safety message, and a transmission period of the second verification message may be longer than a transmission period of the second basic safety message.

BRIEF DESCRIPTION OF THE DRAWINGS

The above and other objects, features and advantages of the present disclosure will be more apparent from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
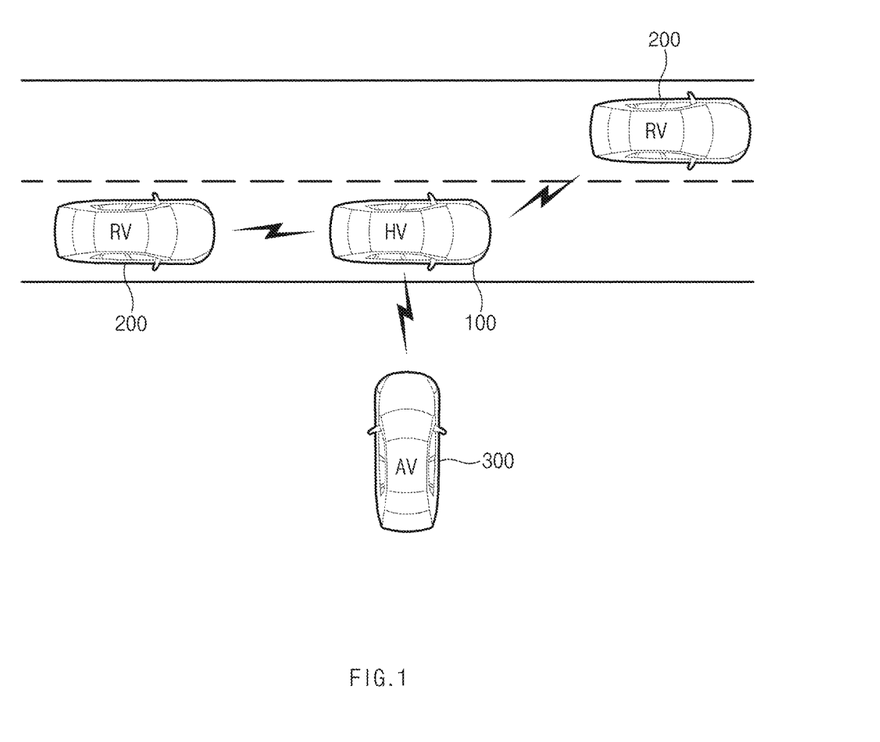
FIG. 1 is a diagram of an example of an inter-vehicular communication environment according to embodiments of the present disclosure.

Referring now to embodiments of the present disclosure, FIG. 1 is a diagram of an example of an inter-vehicular communication environment according to embodiments of the present disclosure, and a description thereof will be made with reference to a host vehicle 100.

As illustrated in FIG. 1, the inter-vehicular communication environment (system) according to the present disclosure includes a host vehicle (HV) 100 and a plurality of remote vehicles (RVs) 200. Then, the host vehicle 100 and the remote vehicles 200 travel on the same road.

The host vehicle 100 transmits basic safety messages (BSMs) including vehicle information thereof to the remote vehicles 200, and the remote vehicles 200 transmit basic safety messages (BSMs) including vehicle information thereof to the host vehicle 100. Then, the vehicle information of the remote vehicles 200 is travel information of the remote vehicles 200 located within a specific distance from the host vehicle 100 while traveling on the same road as the host vehicle 100, and includes information that is helpful to a safe travel of the host vehicle 100.

For the sake of clarity, basic safety messages transmitted by the remote vehicles 200 may be referred to herein as, simply, "basic safety messages" (or BSMs), whereas basic safety messages transmitted by the host vehicle 100 may be referred to herein as "second basic safety messages" (or second BSMs). Similarly, verification messages transmitted by the remote vehicles 200 may be referred to herein as, simply, "verification messages," whereas verification messages transmitted by the host vehicle 100 may be referred to herein as "second verification messages."

The host vehicle 100 controls various safety systems mounted on the host vehicle 100 based on the vehicle information received from the remote vehicles 200. Here, the safety system includes a smart cruise control (SCC) system, a lane departure warning system (LDWS), a side obstacle warning system (SOWS), a collision avoidance system, an automatic emergency braking (AEB) system, and a lane keeping assist system (LKAS).

Meanwhile, an attack vehicle (AV) 300 that is located within a specific distance from the host vehicle 100 but located outside the road on which the host vehicle 100 travels is a vehicle, to which inter-vehicular communication is allowed.

The vehicle information transmitted by the attack vehicle 300 is not helpful to travel of the host vehicle 100 at all, and the safety of the travel of the vehicle cannot be secured if a malicious user transmits false information to the host vehicle 100 through the attack vehicle 300.

According to the present disclosure, a message transmitted by the attack vehicle 300 may be filtered by determining the attack vehicle 100 that provides vehicle information that impedes safety of the host vehicle 100 with a high precision.

According to the present disclosure, the host vehicle 100 and the remote vehicles 200 may include communication modules for supporting vehicle to anything (V2X) wireless communication, and the vehicle communication module may support mobile communication such as WCDMA, LET, or Wi-Fi, and in particular, may support V2X communication with another vehicle, a server in the internet, another system or terminal through a wireless access in vehicular environment (WAVE) wireless communication scheme. A wireless access in vehicular environment (WAVE) wireless communication protocol, which may be applied to the vehicle communication module, is a combination of IEEE802.11p Standard and IEEE P1609 Standard, and is one of the communication standards that may be utilized in constructing various next-generation intelligent traffic systems by supporting inter-vehicular high-speed communication and vehicle to infrastructure communication. The WAVE communication method may use relay of a road-side unit (RSU), but may directly support vehicle to vehicle (V2V) communication. The vehicle communication module that supports a WAVE communication scheme includes a physical layer and a media access control (MAC) layer for supporting a communication delay of 10 msec or less at a maximum vehicle speed of 200 km/h, a communication radius of 1 km, a maximum transmission speed of 54 Mbps, a use frequency of 5.850 to 5.925 GHz, a channel bandwidth of 10 MHz, and 7 channels, and may secure high-speed mobility.

In the V2X communication environment of the present disclosure, the vehicle communication module may communicate with an RSU or a server according to generation of a necessary signal to transmit and receive necessary information through manipulation of the user, such as the driver, or another method. In addition, the vehicle communication module may be connected to various human to machine interface (HMI) electronic devices, such as a mobile communication terminal (e.g., a smartphone, a PDA, and a PDA) or a navigation terminal mounted on the vehicle, which is used by the user, and may communicate with an RSU or a server according to generation of a necessary signal to transmit and receive necessary information through manipulation through an HMI of the user, such as the driver, or another method. The vehicle communication module may include a user interface and may communicate with an RSU or a server according to a request by the user to transmit and receive information.

Figure 2:
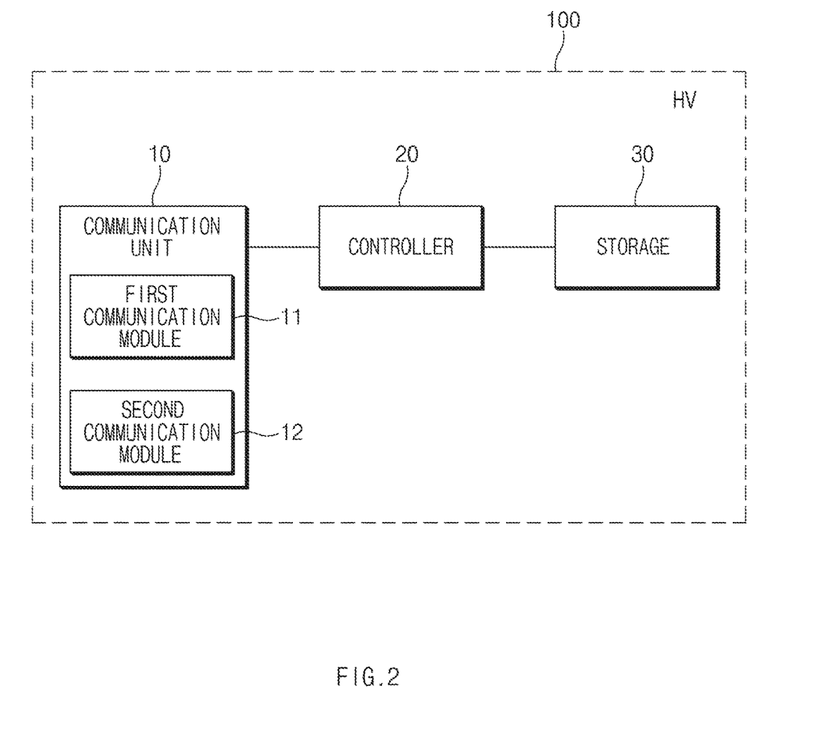
FIG. 2 is a block diagram of an example of an apparatus for verifying a vehicle in an inter-vehicular communication environment according to embodiments of the present disclosure.

FIG. 2 is a block diagram of an example of an apparatus for verifying a vehicle in an inter-vehicular communication environment according to embodiments of the present disclosure, and the vehicle verifying apparatus may be mounted all vehicles, to which inter-vehicular communication is allowed and the vehicle verifying apparatus mounted on the host vehicle 100 will be referenced. In addition, it is assumed that the host vehicle 100, inter-vehicular communication is allowed to all of the remote vehicles 200, and the attack vehicle 300 through authentication.

As illustrated in FIG. 2, the apparatus for verifying a vehicle in an inter-vehicular communication environment according to the present disclosure includes a communication unit 10, a controller 20, and a storage 30.

In a description of the elements, the communication unit may include a first communication module 11 configured to transmit and receive basic safety messages (BSMs) to and from the remote vehicles 200, and a second communication module 12 configured to transmit and receive verification messages to and from the remote vehicles 200.

Here, the basic safety message refers to a message including vehicle information, and the verification message refers to a message including verification information (a certificate digest, a unique number, and a natural list reception list).

Then, the certificate digest is a kind of a data format and may be realized by a hash value of 32 bytes, and the unique number reception list refers to a list in which unique number of vehicles (terminals) that transmitted verification message is recorded.

The first communication module 11 transmits and receives a basic safety message based on a wireless access in vehicular environment (WAVE) communication scheme that is a kind of a dedicated short-range communication (DSRC) technology. As an example, the first communication module 11 may transmit a basic safety message (i.e., second basic safety message) at a transmission power of 23 dBm and a transmission period of 10 Hz (10 times per one second).

The second communication module 12 transmit and receive a verification message to and from the remote vehicles 200 based on a short-range communication scheme. The second communication module may support short-range communication by using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, wireless universal serial bus (USB) technologies. As an example, the second communication module 12 may transmit a second verification message at a transmission power (low power) of 9 dBm and a transmission period of 7 Hz (7 times per one second). The transmission distance of the second verification message is shorter than the transmission distance of the second basic safety message.

Next, the controller 20 performs an overall control such that the elements may normally perform their functions.

Further, the controller 20 may determine whether information transmitted by the remote vehicles, to which inter-vehicular communication is allowed, is trustable by verifying the remote vehicles by using a verification message based on short-range wireless communication in an inter-vehicular communication environment. That is, the controller 20 determines a remote vehicle 200 located in a communication area of the second communication module 12 for a specific period of time as a trustable vehicle, and accordingly, determines that the basic safety message transmitted by the trustable remote vehicle 200 as a trustable basic safety message.

Further, the controller 20 may permit the basic safety message (vehicle information) transmitted by the trustable remote vehicle 200 to be utilized in various systems.

Hereinafter, a process of verifying a remote vehicle 200 by the controller 20 will be described in detail.

1) A process of transmitting a verification message (i.e., second verification message) to a remote vehicle 200 by the controller 20:

The controller 20 receives a verification message from a remote vehicle 200 through the second communication module 12 in the communication unit 10, and records a unique number of the remote vehicle 200 included in the received verification message in a unique number reception list. Then, the unique number reception list of the host vehicle 100 is stored in the storage 30. Further, while the remote vehicle 200 is located in a communication area of the second communication module 12 of the host vehicle 100, the host vehicle 100 periodically receives a verification message from the remote vehicle 200.

Thereafter, the controller 20 generates a second verification message including a certificate digest of the host vehicle 100, a unique number of the host vehicle 100, and a unique number reception list of the host vehicle 100 and transmits the verification message to the remote vehicle 200. Then, while the remote vehicle 200 is located in a communication area of the second communication module 12 of the host vehicle 100, the host vehicle 100 periodically transmits a second verification message to the remote vehicle 200.

2) A process of managing a trust point of a remote vehicle 200 by the controller 20:

The controller 20 receives a verification message from a remote vehicle 200 through the second communication module 12 in the communication unit 10, and identifies whether a unique number of the host vehicle 100 is included in a unique number reception list of the remote vehicle 200 included in the received verification message. This is a process of identifying whether the host vehicle 100 has transmitted a verification message to the remote vehicle 200 before.

Thereafter, if the unique number of the host vehicle 100 is included in the unique number reception list of the remote vehicle 200, the controller 20 adds one point to a trust point used to determine the trustability of the remote vehicle 200.

Thereafter, the controller 20 records a certificate digest of the remote vehicle 200, a unique number of the remote vehicle 200, and a trust point of the remote vehicle 200 in the verification message reception list.

Thereafter, the controller 20 determines whether the accumulated trust point of the remote vehicle 200 on the verification message reception list exceeds a predefined threshold point, and determines that the remote vehicle 200 is trustable if the accumulated trust point exceeds the predefined threshold point.

Meanwhile, the controller 20 subtracts one point from the trust points of the remote vehicles 200 periodically (for example, in unit of one second). This is not to trust even a remote vehicle 200 that has been trusted once if the trust point of the remote vehicle 200 is not added continuously.

Hereinafter, a process of calculating a threshold point will be described in detail with reference to FIG. 3.

Figure 3:
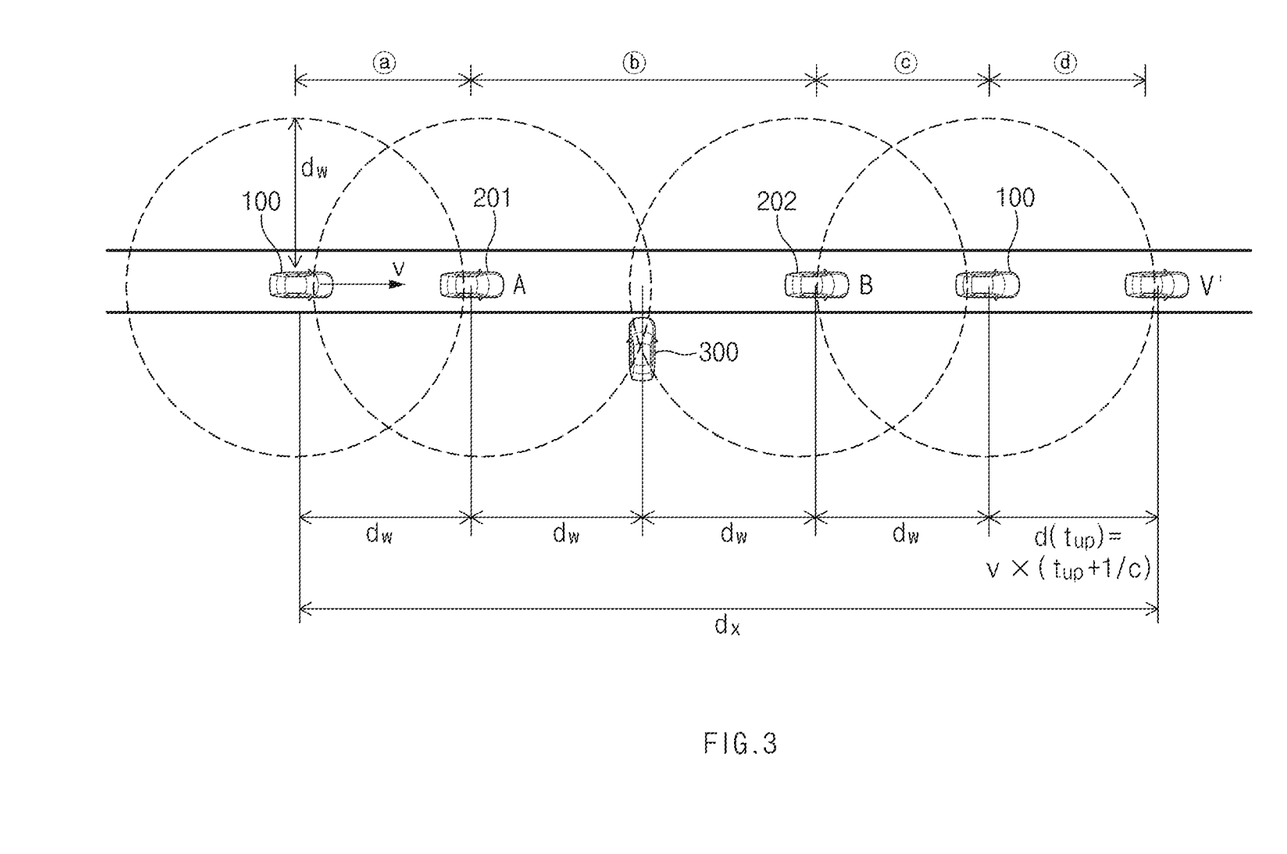
FIG. 3 is a diagram of an example of a process of deriving a threshold point calculating equation by an apparatus for verifying a vehicle in an inter-vehicular communication environment according to embodiments of the present disclosure.

FIG. 3 is a diagram of an example of a process of deriving a threshold point calculating equation by an apparatus for verifying a vehicle in an inter-vehicular communication environment according to embodiments of the present disclosure.

As illustrated in FIG. 3, four sections ⓐ, ⓑ, ⓒ, and ⓓ indicate sections in which the host vehicle 100 may receive a basic safety message from the attack vehicle 300. A reference for determining whether the attack vehicle 300 is trustable in each section follows whether the unique number of the host vehicle 100 is recorded in the unique number reception list of the attack vehicle 300.

In section ⓐ, the host vehicle 100 is located within a specific distance dw from remote vehicle A 201, and similarly, remote vehicle A 201 is located within a specific distance dw from the attack vehicle 300. Further, the attack vehicle 300 is located farther than the specific distance dw from the host vehicle 100, but is located closer than two times 2×dw of the specific distance.

Remote vehicle A 201 receives a verification message (i.e., second verification message) of the host vehicle 100, and records the unique number of the host vehicle 100 included in the verification message of the host vehicle 100 in the unique number reception list of remote vehicle A 201.

The attack vehicle 300 may receive the verification message of remote vehicle A 201, and may record the unique number of remote vehicle A 201 on the unique number reception list of remote vehicle A 201 as well as the unique number of remote vehicle A 201 included in the verification message of remote vehicle A 201, in the unique number reception list of the attack vehicle 300. As a result, the attack vehicle 300 may acquire the unique number of the host vehicle 100 through remote vehicle A 201 although the attack vehicle 300 actually has not received a verification message from the host vehicle 100.

If the attack vehicle 300 transmits a verification message of the attack vehicle 300 to the host vehicle 100 by changing transmission power, the host vehicle 100 determines that the attack vehicle 300 is trustable because the unique number of the host vehicle 100 is recorded in the unique number reception list in the verification message of the attack vehicle 300.

Because the host vehicle 100 determines that the attack vehicle 300 is a trustable vehicle, the host vehicle 100 may receive a basic safety message containing meaningless information or false information from the attack vehicle 300.

Thereafter, if the host vehicle 100 travels and enters section ⓑ, the host vehicle 100 is located within the specific distance dw from the attack vehicle 300. Because the attack vehicle 300 may receive the verification message of the host vehicle 100 while the host vehicle 100 moves in section ⓑ, the attack vehicle 300 may record the unique number of the host vehicle 100 in the unique number reception list of the attack vehicle 300.

If the attack vehicle 300 transmits the verification message of its own, the host vehicle 100 that received the verification message determines that the attack vehicle 300 is trustable because the unique number of the host vehicle 100 is recorded in the unique number reception list of the attack vehicle 300.

Because the host vehicle 100 determines that the attack vehicle 300 is a trustable vehicle, the host vehicle 100 may receive a basic safety message containing meaningless information or false information from the attack vehicle 300.

In section ⓒ, the host vehicle 100 is located within a specific distance dw from remote vehicle B 202, and remote vehicle B 202 is located within the specific distance dw from the attack vehicle 300. Further, the attack vehicle 300 is located farther than the specific distance dw from the host vehicle 100, but is located closer than two times 2×dw of the specific distance.

Remote vehicle B 202 receives a verification message of the host vehicle 100, and records the unique number of the host vehicle 100 included in the verification message of the host vehicle 100 in the unique number reception list of remote vehicle B 202.

The attack vehicle 300 may receive the verification message of remote vehicle B 202, and may record the unique number of remote vehicle B 202 on the unique number reception list of remote vehicle B 202 as well as the unique number of remote vehicle B 202 included in the verification message of remote vehicle B 201, in the unique number reception list of the attack vehicle 300. As a result, the attack vehicle 300 may acquire the unique number of the host vehicle 100 through remote vehicle B 202 although the attack vehicle 300 actually has not received a verification message from the host vehicle 100.

If the attack vehicle 300 transmits a verification message of the attack vehicle 300 to the host vehicle 100 by changing transmission power, the host vehicle 100 determines that the attack vehicle 300 is trustable because the unique number of the host vehicle 100 is in the unique number reception list of the attack vehicle 300.

Because the host vehicle 100 determines that the attack vehicle 300 is a trustable vehicle, the host vehicle 100 may receive a basic safety message containing meaningless information or false information from the attack vehicle 300.

Section ⓓ indicates a section in which a basic safety message may be received even when the host vehicle 100 is spaced apart from the attack vehicle 300 by a distance that exceeds two times (2×dw) of the specific distance in consideration of the speed and a message update time period of the host vehicle 100.

While the host vehicle 100 moves to point V', the unique number of the host vehicle 100 is left in the unique number reception list of the attack vehicle 300. Then, V' indicates a result (distance) obtained by multiplying the speed v of the host vehicle 100 by an exchange period tup of the unique number.

If the attack vehicle 300 transmits a verification message of the attack vehicle 300 to the host vehicle 100 by changing transmission power, the host vehicle 100 determines that the attack vehicle 300 is trustable because the unique number of the host vehicle 100 is in the unique number reception list of the attack vehicle 300.

The host vehicle 100 may receive a basic safety message containing meaningless information or false information from the attack vehicle 300 while the host vehicle 100 moves to point V'.

Here, when a transmission frequency of a verification message of the attack vehicle 300 is c Hz, the verification message of the attack vehicle 300 may arrive even after 1/c seconds.

Accordingly, the distance d(tup) at which the host vehicle 100 may receive a basic safety message from the vehicle 300 while the host vehicle 100 moves to point V' at a speed of v may be represented in Equation 1 below.

$$d(tup) = v \times (tup + 1/c)$$ [Equation 1]

Here, in Equation 1, v denotes the speed of the host vehicle 100, tup denotes the exchange period (time period) of a unique number, and c denotes a verification message transmission frequency of the attack vehicle 100.

As a result, the maximum distance dx at which the host vehicle 100 may receive a basic safety message from the attack vehicle 300 may be represented as in Equation 2 below.

$$dx = 4 \times dw + v \times (tup + 1/c)$$ [Equation 2]

Here, in Equation 2, dw denotes a distance of the section (i.e., a transmission distance of the verification message).

Meanwhile, because the trust point of the attack vehicle 300 is subtracted by one point per one second when the transmission period of the verification message is fw Hz, a maximum of (fw−1) points may be obtained in one second. Further, a time period taken when the host vehicle 100 moves at a speed of v becomes dx/v.

As a result, the threshold point θH may be expressed by a product of a maximum point of the remote vehicle 200, which may be obtained by the host vehicle 100 in one second in section Dx and a time period that is taken for the host vehicle 100 to move section dx. This is as Equation 3 below.

$$\theta H = (fw-1) \times dx/v$$ [Equation 3]

Next, the storage 30 stores the verification message reception list in which a certificate digest of the remote vehicle 200 and the unique number of the remote vehicle 200 included in the verification message received from the remote vehicle 200, and the trust point of the remote vehicle 200 calculated by the controller 20 are matched and recorded.

Further, the storage 30 may further store the unique number reception list in which the unique number of the remote vehicle 200 included in the verification message received from the remote vehicle 200 is recorded.

The storage 30 may include at least one type of storage medium of a flash memory type, a hard disk type, a solid state disk (SSD) type, a silicon disk drive (SDD) type, a multimedia card micro type, or a card type memory (for example, an SD or XD memory), a random access memory (RAM), a static random access memory (SRAM), a read-only memory (ROM), an electrically erasable programmable read-only memory (EEPROM), a programmable read-only memory (PROm), a magnetic memory, a magnetic disk, and an optical disk.

Figure 4:
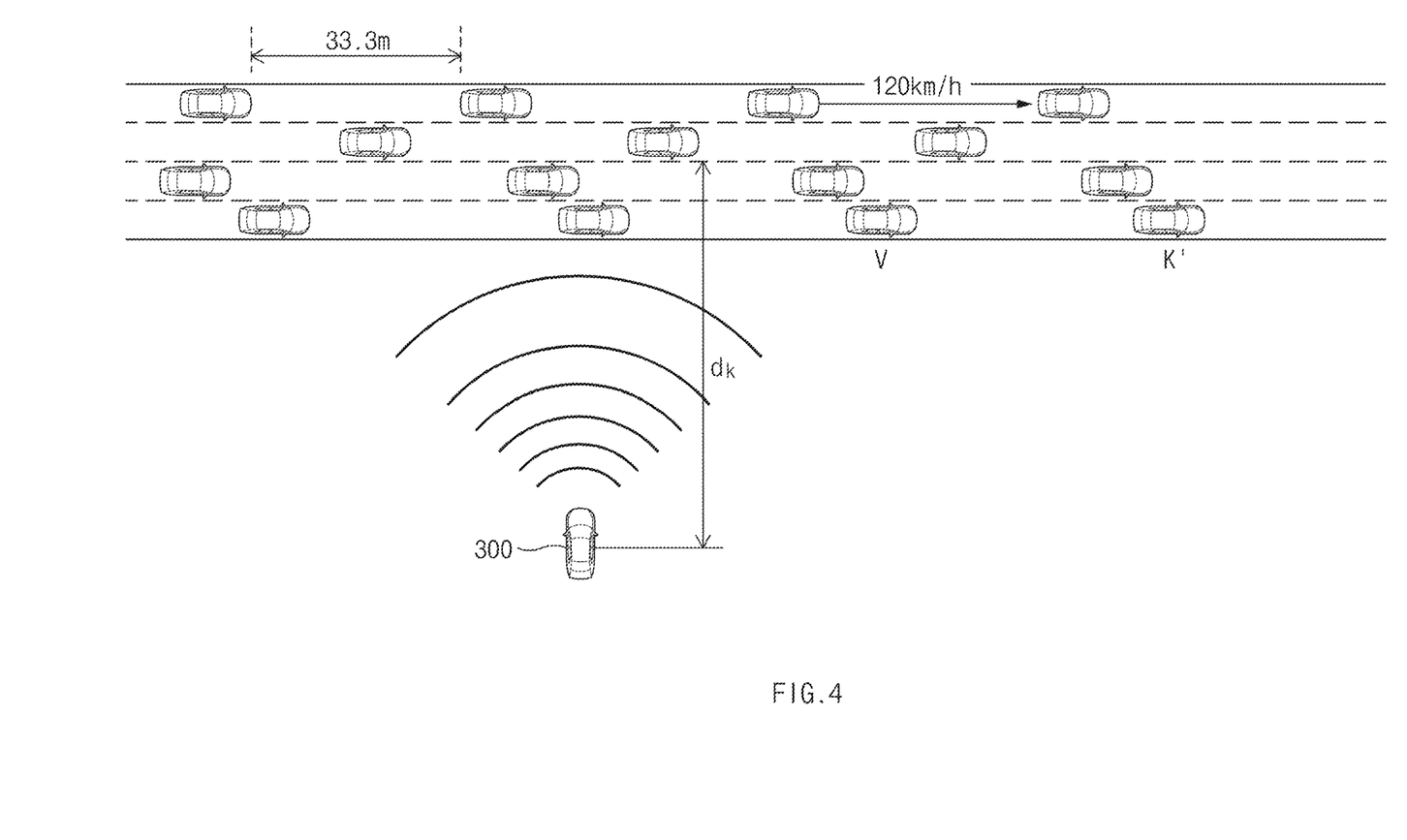
FIG. 4 is a diagram of an example of a test environment of an apparatus for verifying a vehicle in an inter-vehicular communication environment according to embodiments of the present disclosure.

FIG. 4 is a diagram of an example of a test environment of an apparatus for verifying a vehicle in an inter-vehicular communication environment according to embodiments of the present disclosure.

As illustrated in FIG. 4, the test was performed on a four-lane highway, and a detailed condition thereof is as follows.

A lane width of the highway is 3 m, an interval between vehicles is 33.3 m, the speed of the vehicle is 120 km/h, a transmission power of a basic safety message transmitted by the attack vehicle 300 is 23 dBm, a transmission period of the basic safety message transmitted by the attack vehicle 300 is 10 Hz, a transmission power of the verification message transmitted by the attack vehicle 300 is 9 dBm, and the transmission period of the verification message transmitted by the attack vehicle 300 is 7 Hz.

It was observed whether the vehicle on the highway, to which the present disclosure is applied, utilized the basic safety message transmitted by the attack vehicle 300 in control while the attack vehicle 300 is stopped and a distance dk between the attack vehicle 300 and the highway is adjusted. Then, when a specific vehicle on the highway utilizes the basic safety message transmitted by the attack vehicle 300, it is called an attack success. As an example, the basic safety message is false information that reports that the vehicle is stopped at point K'.

Figure 5:
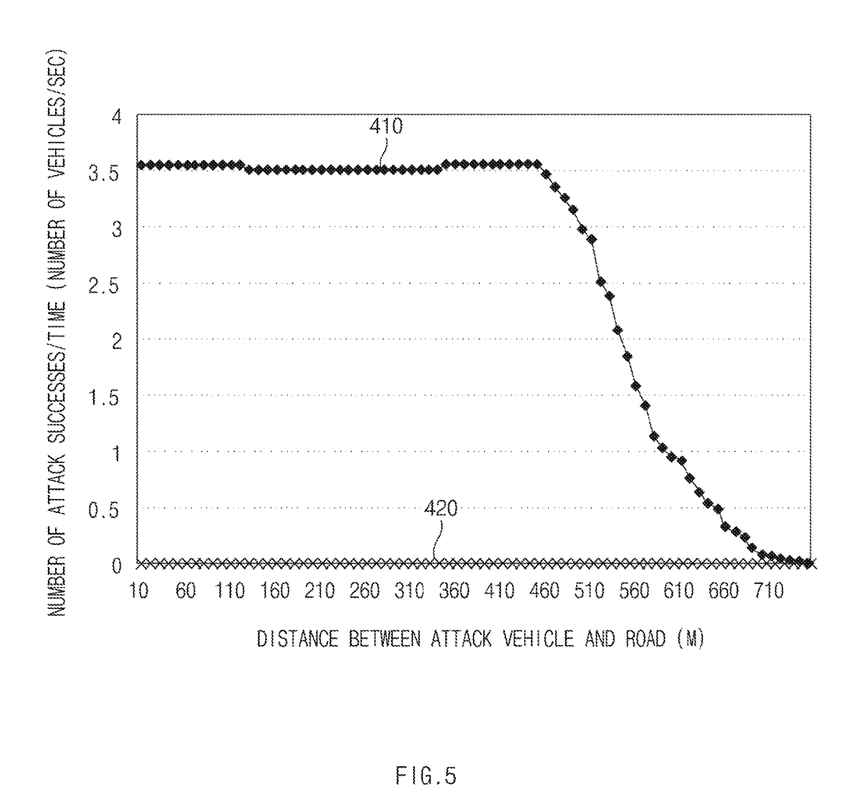
FIG. 5 is a diagram of an example of a test result of an apparatus for verifying a vehicle in an inter-vehicular communication environment according to embodiments of the present disclosure.

The result is as illustrated in FIG. 5.

FIG. 5 is a diagram of an example of a test result of an apparatus for verifying a vehicle in an inter-vehicular communication environment according to embodiments of the present disclosure.

As shown in FIG. 5, the longitudinal axis indicates the number of attack successes per one second and the transverse axis indicates a distance between the attack vehicle 300 and the highway. Then, the number of attack successes refers to the number of vehicles that utilize the basic safety message transmitted by the attack vehicle 300 in control.

Reference numeral 410 denotes the number of successes when the present disclosure is not applied, and reference numeral 420 denotes the number of successes when the present disclosure is applied.

When the present disclosure is not applied (410), it can be seen that most vehicles utilize the basic safety message transmitted by the attack vehicle 300 in control. Then, the reason why the number of vehicles that utilize the basic safety message transmitted by the attack vehicle 300 in control decreases at a point of about 460 m is caused by the transmission distance of the basic safety message, and it can be seen that the vehicle on the highway cannot receive the basic safety message transmitted by the attack vehicle 300 because the it completely deviates the communication distance of the attack vehicle 300 if the attack vehicle 300 is spaced apart from the highway by about 710 m.

Meanwhile, when the present disclosure is applied (420), it can be seen that vehicles on the highway do not utilize the basic safety message transmitted by the attack vehicle 300 in control regardless of the distance.

Figure 6:
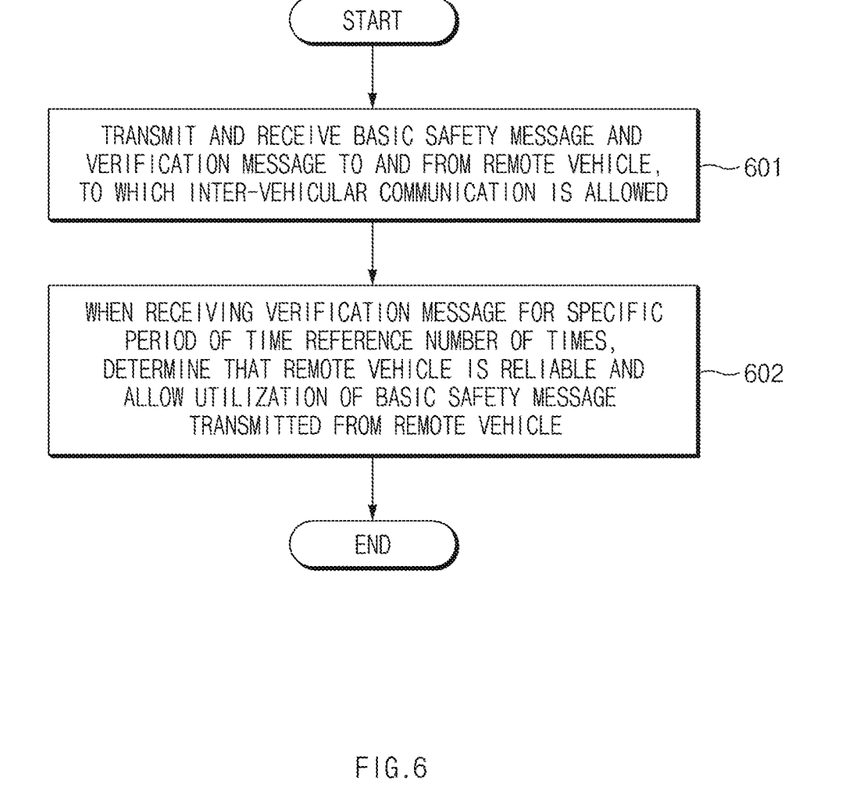
FIG. 6 is a flowchart of an example of a method for verifying a vehicle in an inter-vehicular communication environment according to embodiments of the present disclosure.

FIG. 6 is a flowchart of an example of a method for verifying a vehicle in an inter-vehicular communication environment according to embodiments of the present disclosure.

First, the communication unit 10 transmits and receives a basic safety message and a verification message to and from a remote vehicle, to which inter-vehicular communication is allowed (601).

Thereafter, when the verification message is received a predefined number of times for a predefined period of time, the controller 20 determines that the remote vehicle is trustable to allow utilization of the basic safety message transmitted by the remote vehicle (602).

According to embodiments of the present disclosure, it may be determined whether information transmitted by a remote vehicle, to which inter-vehicular communication is allowed, is trustable, by verifying the remote vehicle using a verification message based on short-range wireless communication in an inter-vehicular environment.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for verifying a vehicle in an inter-vehicular communication environment, the apparatus comprising:
    a first communication module configured to receive a basic safety message from a remote vehicle that is allowed to engage in inter-vehicular communication based on a wireless access in vehicular environment (WAVE) communication scheme;
    a second communication module configured to receive a verification message from the remote vehicle based on a short-range wireless communication scheme selected from a group consisting of Bluetooth, radio frequency identification (RFID), infrared data association (IrDA), ultra wideband (UWB), ZigBee, near-field communication (NFC), wireless-fidelity (Wi-Fi), Wi-Fi Direct, and wireless universal serial bus (USB); and
    a controller configured to determine that the remote vehicle is reliable when the second communication module receives the verification message from the remote vehicle at least a predefined number of times over a predefined period of time, and to generate permission to utilize the basic safety message received from the remote vehicle when the controller determines that the remote vehicle is reliable.

2. The apparatus of claim 1, wherein the verification message received from the remote vehicle includes a certificate digest of the remote vehicle, a unique number of the remote vehicle, and a unique number reception list of the remote vehicle.

3. The apparatus of claim 2, wherein the controller is further configured to generate a second verification message including a unique number reception list of a host vehicle, a certificate digest of the host vehicle, and a unique number of the host vehicle, and to control the second communication module to transmit the generated second verification message to the remote vehicle.

4. The apparatus of claim 3, wherein the controller is further configured to determine whether the remote vehicle is reliable based on a number of times a verification message including the unique number of the host vehicle is received from the remote vehicle.

5. The apparatus of claim 4, wherein the controller is further configured to generate a trust point based on the number of times the verification message including the unique number of the host vehicle is received from the remote vehicle, and to determine that the remote vehicle is reliable when the calculated trust point exceeds a threshold point.

6. The apparatus of claim 5, wherein the controller is further configured to match the certificate digest of the remote vehicle, the unique number of the remote vehicle, and the trust point of the remote vehicle, and to record a result of the matching in the unique number reception list of the second verification message.

7. The apparatus of claim 5, wherein the controller is further configured to subtract a predefined point from the calculated trust point per one second.

8. The apparatus of claim 1, wherein the second communication module is further configured to transmit the second verification message based on short-range wireless communication.

9. The apparatus of claim 1, wherein a transmission distance of the second verification message is shorter than the transmission distance of the second basic safety message, and a transmission period of the second verification message is longer than a transmission period of the second basic safety message.

10. A method for verifying a vehicle in an inter-vehicular communication environment, the method comprising:
   receiving, by a first communication module, a basic safety message from a remote vehicle that is allowed to engage in inter-vehicular communication based on a wireless access in vehicular environment (WAVE) communication scheme;
   receiving, by a second communication module, a verification message from the remote vehicle based on a short-range wireless communication scheme selected from a group consisting of Bluetooth, radio frequency identification (RFID), infrared data association (IrDA), ultra wideband (UWB), ZigBee, near-field communication (NFC), wireless-fidelity (Wi-Fi), Wi-Fi Direct, and wireless universal serial bus (USB);
   determining, by a controller, that the remote vehicle is reliable when the second communication module receives the verification message from the remote vehicle at least a predefined number of times over a predefined period of time; and
   generating, by the controller, permission to utilize the basic safety message received from the remote vehicle.

11. The method of claim 10, wherein the verification message received from the remote vehicle includes a certificate digest of the remote vehicle, a unique number of the remote vehicle, and a unique number reception list of the remote vehicle.

12. The method of claim 11, wherein the determining that the remote vehicle is reliable comprises:
   generating, by the controller, a second verification message including a unique number reception list of a host vehicle, a certificate digest of the host vehicle, and a unique number of the host vehicle; and
   controlling, by the controller, the second communication module to transmit the generated second verification message to the remote vehicle.

13. The method of claim 12, wherein the determining that the remote vehicle is reliable further comprises:
   determining, by the controller, whether the remote vehicle is reliable based on a number of times a verification message including the unique number of the host vehicle is received from the remote vehicle.

14. The method of claim 13, wherein the determining that the remote vehicle is reliable further comprises:
   generating, by the controller, a trust point based on the number of times the verification message including the unique number of the host vehicle is received from the remote vehicle; and
   determining, by the controller, that the remote vehicle is reliable when the calculated trust point exceeds a threshold point.

15. The method of claim 14, wherein the determining that the remote vehicle is reliable further comprises:
   matching, by the controller, the certificate digest of the remote vehicle, the unique number of the remote vehicle, and the trust point of the remote vehicle; and
   recording, by the controller, a result of the matching in the unique number reception list of the second verification message.

16. The method of claim 14, further comprising subtracting, by the controller, a predefined point from the calculated trust point per one second.

17. The method of claim 10, wherein the second verification message is transmitted based on short-range wireless communication.

18. The method of claim 10, wherein a transmission distance of the second verification message is shorter than the transmission distance of the second basic safety message, and a transmission period of the second verification message is longer than a transmission period of second the basic safety message.

* * * * *